United States Patent
Herring et al.

(10) Patent No.: US 7,087,840 B2
(45) Date of Patent: Aug. 8, 2006

(54) CABLE MANAGEMENT SYSTEM WITH PATCH PANEL

(75) Inventors: Nathaniel L. Herring, Mystic, CT (US); Robert C. Baxter, Warwick, RI (US); Glenn T. Kierstead, Coventry, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/003,010

(22) Filed: Dec. 3, 2004

(65) Prior Publication Data

US 2006/0118321 A1    Jun. 8, 2006

(51) Int. Cl.
*H02G 3/04*    (2006.01)
(52) U.S. Cl. .................. 174/101; 174/68.3; 174/99 E; 361/826
(58) Field of Classification Search .............. 174/48, 174/68.1, 68.3, 96, 99 E, 100, 101, 50, 53, 174/58, 65 R, 67, 480, 481, 484, 95, 97; 211/26, 96–98, 101, 102, 169, 173, 174; 248/59, 65; 361/600, 601, 610, 616, 645, 361/825, 826, 828, 829
See application file for complete search history.

(56) References Cited

U.S. PATENT DOCUMENTS

| | | | |
|---|---|---|---|
| 2,531,110 A | 11/1950 | Cisler | |
| 3,403,220 A * | 9/1968 | Riedel et al. ................ | 174/101 |
| 3,697,667 A * | 10/1972 | Pollak et al. ............... | 174/68.3 |
| 4,529,833 A * | 7/1985 | Weis ............................ | 174/48 |
| 4,712,232 A | 12/1987 | Rodgers | |
| 5,161,997 A * | 11/1992 | Defibaugh et al. ........ | 439/540.1 |
| 5,175,673 A | 12/1992 | Roger et al. | |
| 5,326,934 A | 7/1994 | LeMaster et al. | |
| 5,337,400 A * | 8/1994 | Morin et al. ................. | 385/135 |
| 5,366,388 A * | 11/1994 | Freeman et al. ......... | 439/540.1 |
| 5,548,489 A | 8/1996 | Reed et al. | |
| 5,599,191 A | 2/1997 | DeLara | |
| 5,602,364 A * | 2/1997 | Ustin ......................... | 174/68.3 |
| 5,647,763 A | 7/1997 | Arnold | |
| 5,765,698 A * | 6/1998 | Bullivant ..................... | 211/26 |
| 6,053,764 A * | 4/2000 | Curry et al. ................. | 439/557 |
| 6,086,415 A * | 7/2000 | Sanchez et al. ........... | 439/540.1 |
| 6,102,214 A | 8/2000 | Mendoza | |
| 6,215,069 B1 * | 4/2001 | Martin et al. ............... | 174/68.3 |
| 6,245,998 B1 * | 6/2001 | Curry et al. ............... | 174/72 A |
| 6,300,570 B1 * | 10/2001 | Lai ............................. | 174/67 |
| 6,322,176 B1 * | 11/2001 | Wild ........................ | 312/223.6 |
| 6,494,414 B1 * | 12/2002 | Benito-Navazo ........... | 248/68.1 |
| 6,498,716 B1 * | 12/2002 | Salinas et al. .............. | 361/610 |
| 6,605,782 B1 | 8/2003 | Krietzman et al. | |
| 6,683,252 B1 * | 1/2004 | Sobel et al. ................. | 174/67 |

(Continued)

FOREIGN PATENT DOCUMENTS

JP    2002/124790 A    4/2002

*Primary Examiner*—Dean A. Reichard
*Assistant Examiner*—Adolfo Nino
(74) *Attorney, Agent, or Firm*—Michael E. Stimson; Alfred N. Goodman; Mark S. Bicks

(57) ABSTRACT

A patch panel assembly having a bracket with a base extending between first and second side walls. The bracket defines a cable receiving passageway. First and second patch panels are coupled to the first and second side walls for pivotal movement about first and second vertical pivot axes between open and closed positions. The patch panels are selectively engageable with one another in their closed positions for limiting access across the cable receiving passageway.

28 Claims, 6 Drawing Sheets

U.S. PATENT DOCUMENTS 6,737,576 B1 * 5/2004 Dinh .......................... 174/50
6,810,191 B1 * 10/2004 Ferris et al. ............... 174/68.3
6,835,890 B1 * 12/2004 Dinh et al. .................. 174/66
6,866,541 B1 * 3/2005 Barker et al. ............ 439/540.1
6,884,942 B1 * 4/2005 McGrath et al. ........... 174/68.1

* cited by examiner

CABLE MANAGEMENT SYSTEM WITH PATCH PANEL

FIELD OF THE INVENTION

The present invention relates to a cable management system with a patch panel assembly for organizing and simplifying wiring and connections in an electronic device, such as a typical server cabinet. More specifically, first and second patch panels are mounted to a support frame for pivoting about two laterally spaced, substantially parallel vertical axes.

BACKGROUND OF THE INVENTION

Patch panels or cross-connect products provide a centralized point for connecting voice and/or data lines. Patch panels include a plurality of energy transmission connectors, e.g., electrical connectors and/or fiber optic cable connectors. Patch panels are commonly located in confined, relatively remote areas, such as termination closets. Installers generally perform wire terminations with little room to maneuver patch panels or themselves. Therefore, patch panel assemblies must be compact to save space, and to facilitate installer access to each patch panel.

Each connector must be appropriately and clearly labeled to facilitate the proper connection. The labeling must be easily visible despite the presence of numerous cables which tend to obscure the labels provided on or immediately adjacent directly on the connectors. High density is required to allow the maximum quantity of connectors in a limited rack or closet space. Relatively large numbers of connectors and cables or patch cords within a limited space requires efficient use of the space without undue complexity and without undue restriction on the ability to make and break the connections.

Most patch panels are mounted on either a rack or a wall mount bracket and require rear access. When individual conductors are to be coupled to the insulation displacement contacts on the jacks or connectors, the limited space available when the patch panels are mounted in a rack makes maintenance difficult. Also, conventional bracket mounted patch panels cannot be densely stacked and provide limited patch panel access. Additionally, cable access to conventional mounted brackets occurs through the top or bottom of the bracket to prohibit stacking.

An example of a prior art patch panel can be found in U.S. Pat. No. 5,765,698 to Bullivant, the entire contents of which are hereby incorporated by reference.

SUMMARY OF THE INVENTION

Accordingly, an object of this invention is to provide a cable management system having easy access which is simple and inexpensive to manufacture.

Another object of this invention is to provide a cable management system that reduces cable congestion and increases airflow to the space.

A further object of the invention is to provide a cable management system having at least two patch panels for pivoting about two different, substantially vertical and parallel axes that are readily adaptable to a wide variety of installations.

The foregoing objects are basically attained by a patch panel assembly including a bracket including a base extending between first and second side walls. The bracket defines a cable receiving passageway. First and second patch panels are coupled to the first and second side walls for pivotal movement about first and second vertical pivot axes between open and closed positions. The patch panels are selectively engageable with one another in the closed positions thereof for limiting access across the cable receiving passageway.

The foregoing objects are also obtained by a cable management system having a rack including a wall and an electronic device support. The system further includes a bracket having a base extending between first and second side walls. The bracket defines a cable receiving passageway. The base has a fastener which extends therethrough for securing said bracket to the wall. First and second patch panels are coupled to the first and second side walls for pivotal movement about first and second vertical pivot axes between open and closed positions. The patch panels are selectively engageable with one another in the closed positions for limiting access across the cable receiving passageway.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF THE INVENTION

Figure 1:
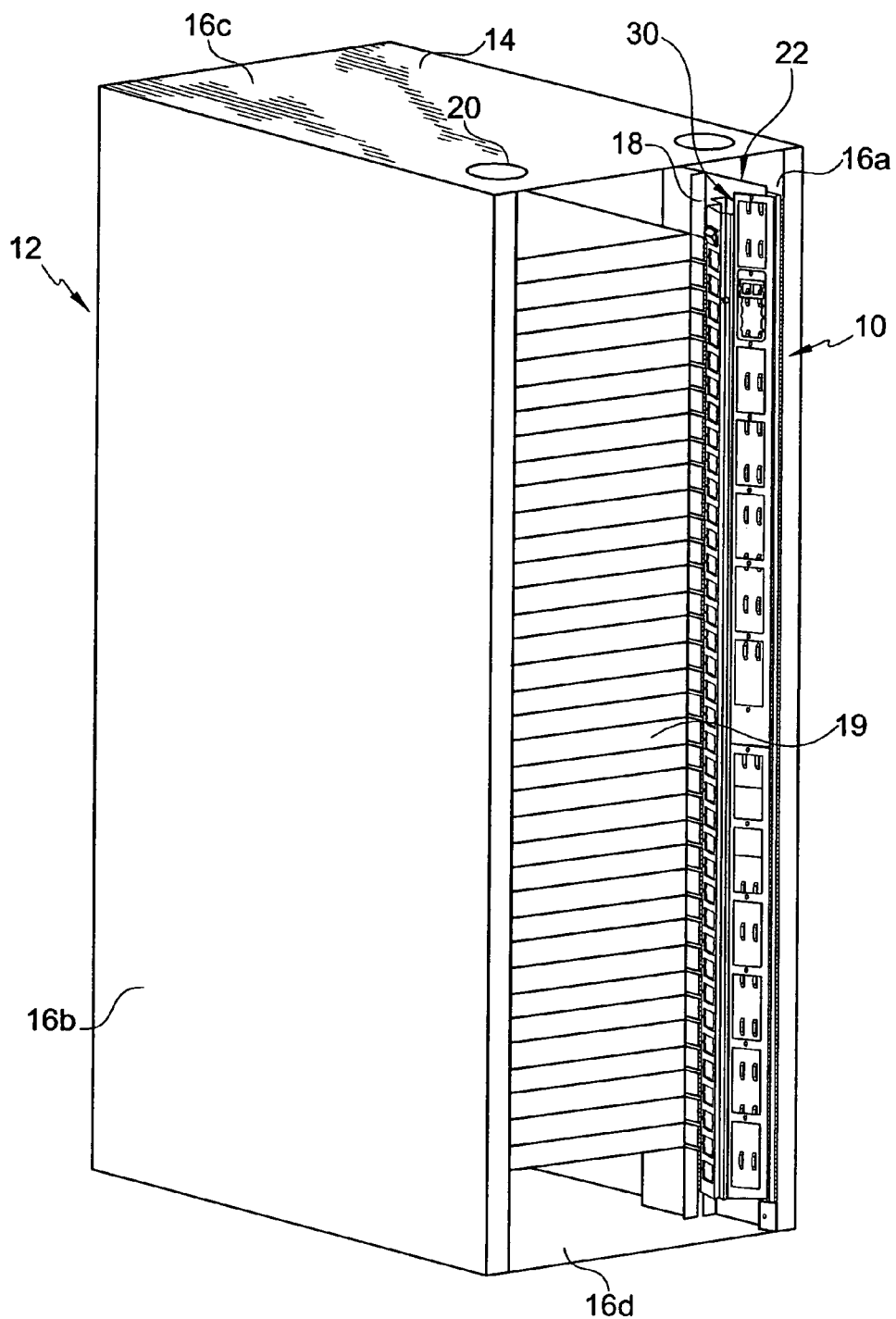
FIG. 1 is a perspective view of a server cabinet with a patch panel assembly in accordance with an embodiment of the present invention.
Figure 2:
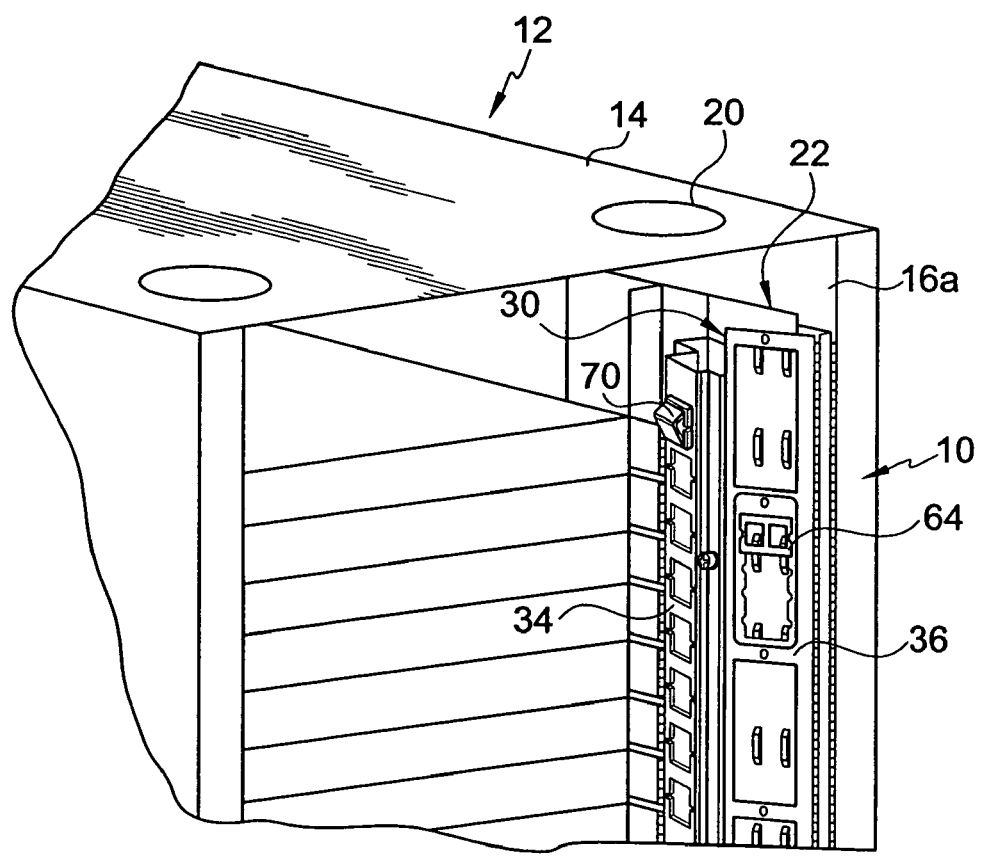
FIG. 2 is a partial, enlarged perspective view of the server cabinet FIG. 1 illustrating first and second patch panels in their closed positions.
Figure 3:
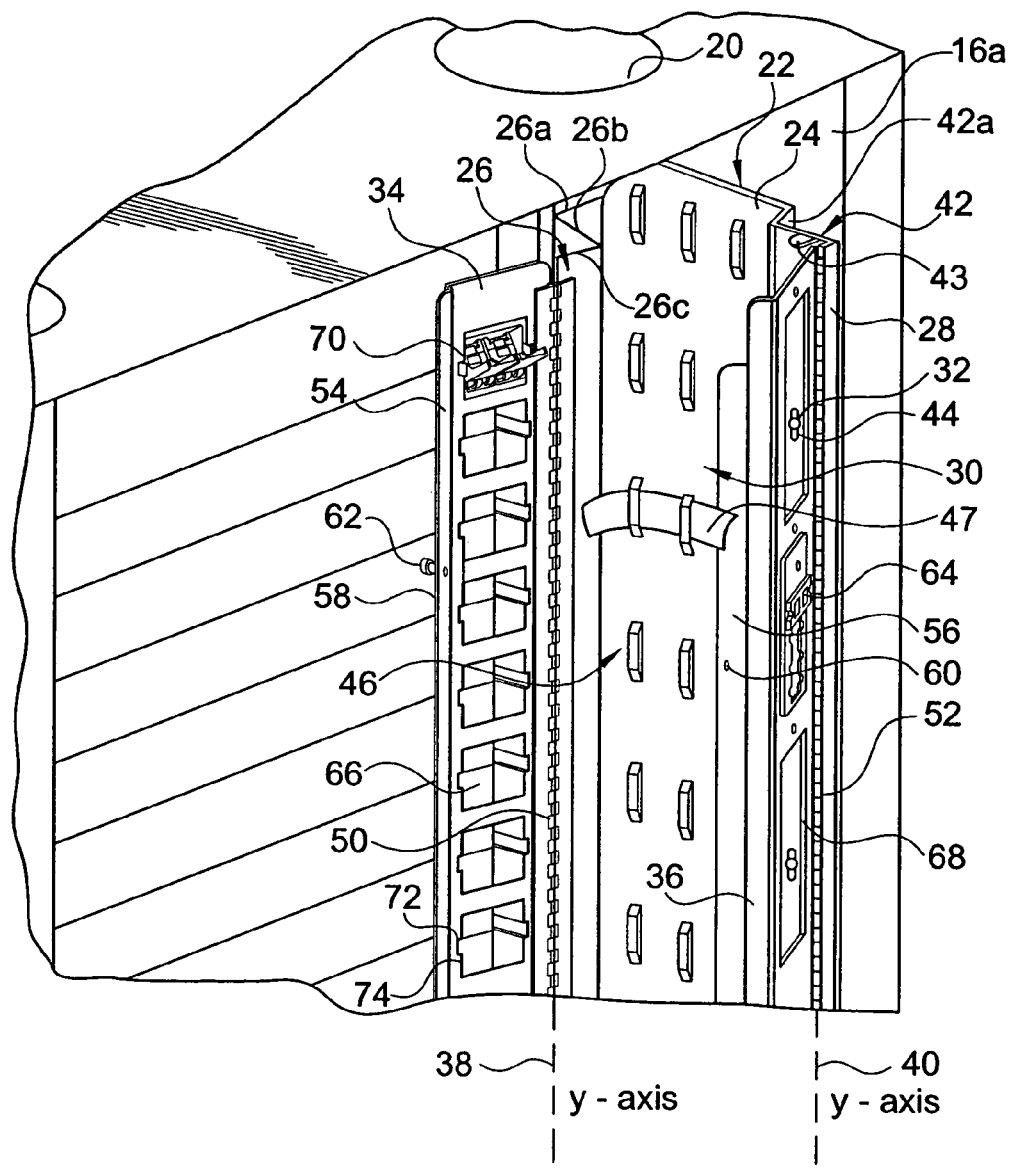
FIG. 3 is a partial, enlarged perspective view of the server cabinet of FIG. 1 illustrating first and second patch panels in their open positions.
Figure 4:
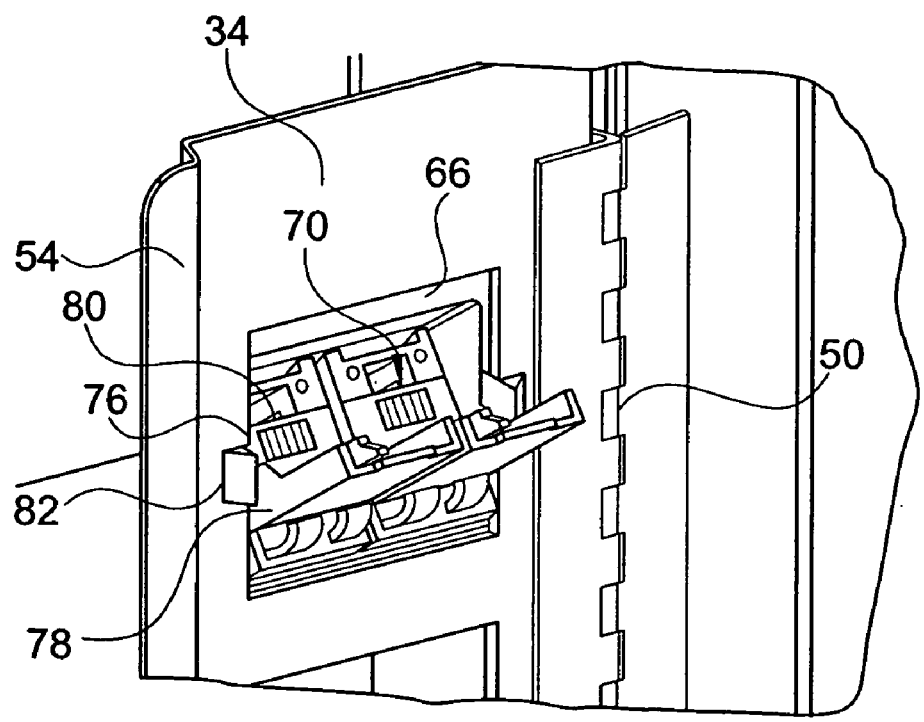
FIG. 4 is a partial, enlarged perspective view of the server cabinet of FIGS. 1 and 3 illustrating a patch panel ready to receive a data jack.

Referring initially to a first embodiment of the invention illustrated in FIGS. 1–5, a patch panel assembly 10 is in a cable management system 12 in the form of a server cabinet or rack 14. The rack 14 includes walls 16a–d and an electronic device support 18 for electronic devices 19, such as servers. Cable management system 12 includes a bracket 22 having a base 24 extending between first and second side walls 26, 28 (FIG. 3). Bracket 22 defines a cable receiving passageway 30. First and second patch panels 34, 36 are coupled to the first and second side walls 26, 28, respectively, for pivotal movement about first and second vertical pivot axes 38, 40 between an open position (FIG. 3) and a closed position (FIG. 4).

Rack 14 can be constructed of any suitable material for forming a support frame, preferably having a top wall 16c, a bottom wall 16d, side walls 16a–b, and an electronic device support 18. Each wall 16a–d may include a knockout 20 for use as a cable receiving aperture or for facilitating airflow to the rack 14. Each wall is substantially planar, and is rectangular in its peripheral configuration. Rack 14 should be constructed of sufficient depth and rigidity for accommodating electronic devices. An electronic device is generally any instrumentality or aggregate of instrumentalities primarily designed to compute, classify, process, transmit, receive, retrieve, originate, switch, store, display, manifest measure, detect, record, reproduce, handle or utilize any form of electronic information, intelligence or data for business, scientific, control or other purposes (e.g. servers, UPSs, storage devices, and other networking equipment). Electronic device support 18 is conventional; and utilizes one of or a combination of welding, rivets, screws, fasteners, locking grooves, or other conventional means for affixing the electronic device to the rack 14.

As best seen in FIG. 3, base 24 is substantially flat and rectangularly shaped. Base 24 has top and bottom surfaces, and side edges. The bottom surface of the base 24 abuts side wall 16a. Base 24 side edges are adapted for connection to portions of side wall 26 and flange 42, respectively, and form a length. The top surface of the base 24 defines a lower boundary of cable receiving passageway 30, between first and second side walls 26, 28. The cable receiving passageway 30 facilitates receiving and organizing cables, wiring, and connectors necessary for operation of the electronic device. The cable receiving passageway 30 is substantially U-shaped or C-shaped. When the installer moves the first and second patch panels 34, 36 to the open positions FIG. 3), the cable receiving passageway 30 can be easily accessed by the installer. When the installer moves the patch panels 34, 36 to the closed positions (FIGS. 1, 2, and 5), access to the cable receiving passageway is restricted.

The base 24 preferably includes securing elements 46 on the top surface. The securing elements 46 can retain any suitable fastener. Preferably, hook and loop fastener strips 47 threaded through security elements 46 are used for retaining cables, wires, or connectors within the cable receiving passageway 30. Each securing element 46 is substantially C-shaped and formed by a narrow section of metal or plastic integrally connected (e.g fasteners, welding, and adhesive) to or stamped out from the top surface of the base 24. Each fastener strip 47 has top and bottom surfaces releasably securable to one another. Preferably one side has hooks for fastening to the loops on the other side for retaining the cables encircled by the fastener strips 47. However, any suitable tying or strap element would be sufficient.

Figure 5:
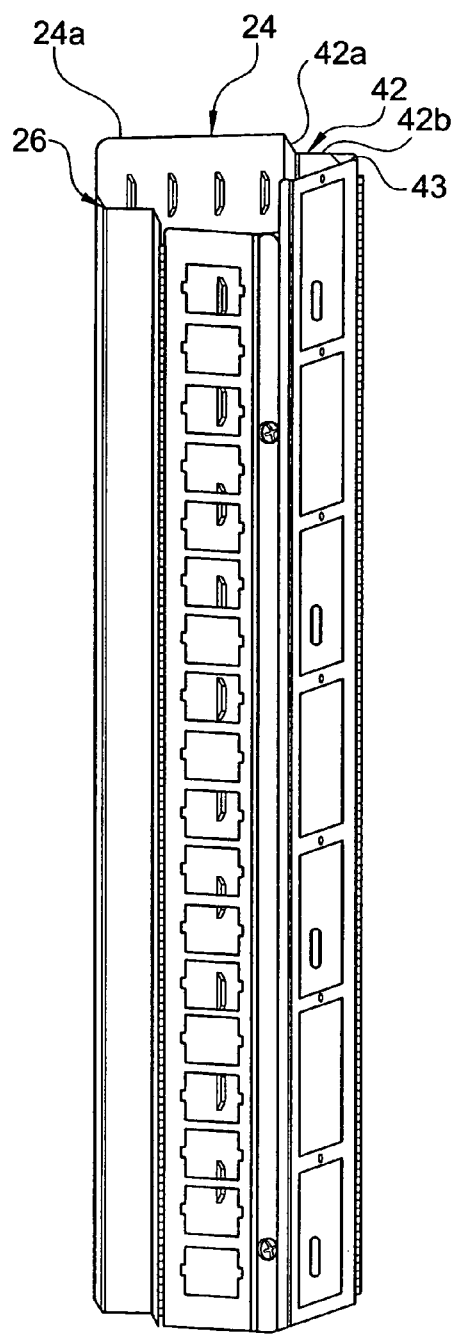
FIG. 5 is a perspective view of the patch panel assembly of FIG. 2 in accordance with an embodiment of the present invention.

As seen in FIGS. 3 and 5, extending from at least one side edge of the base 24 is a substantially L-shaped flange 42. The flange 42 is integrally connected with a side of the base 24 and is flush with a top edge 24a of the base 24. However, the flange can be offset from top edge 24a. The flange also includes top and bottom surfaces, and side edges. A first section 42a of the flange 42 extends laterally in a direction away from side wall 16a and perpendicular to the base 24. A second section of the flange 42b extends in a direction substantially perpendicular to first section 42a and parallel with base 24. In a preferred embodiment, a plurality of elongated apertures 44 extend between the top and bottom surfaces of the flange second section 42b for receiving fasteners 32 (e.g. sheet metal screw, rivets, pins) for securing the bracket 22 to at least one side wall 16a of the rack 14. However, the apertures 44 can be placed anywhere along the base 24 or flange 42.

A patch panel stop member 43 is provided for limiting rotation of patch panel 36 about pivot axis 40. Patch panel stop member 43 is integrally connected to flange second section 42b. Patch panel stop member 43 extends from the top edge of second section 42b in a direction perpendicular to base top edge 24a. The patch panel stop member 43 is substantially rectangular shaped. The patch panel stop member 43 has top and bottom surfaces, and side edges. A top edge of the patch panel stop member 43 is partially tapered in a direction towards side wall 28. As the patch panel 36 is moved to the closed position (FIG. 5), the partially tapered top edge abuts a planar section of the patch panel 36 for limiting rotation of the patch panel 36. The patch panel stop member 43 is connected by one of welding, stamping, or fastening in a conventional manner.

Bracket side wall 26 is connected directly to the base 24 along the length of the base, but with the side wall 26 top edge spaced from top edge 24a of the base. However, the side wall 26 top edge can be flush. Side wall 26 is substantially Z-shaped; however, the side wall could be substantially U-shaped, C-shaped, or L-shaped. Any particular orientation may be utilized for facilitating connection of the first and second patch panels 34, 36 in the closed positions (FIG. 2) and for mating with the existing structure of the server cabinet or the like. Side wall 26 has a first section 26a, a second section 26b, and a third section 26c. First section 26a and third section 26c are substantially perpendicular to the base 24, and parallel with one another. Second section 26b extends in a direction substantially parallel with the base 24, joining the first and second sections. A piano-type hinge 50 is attached to a side edge of third section 26c for attaching patch panel 34.

Bracket side wall 28 is connected directly to flange second section 42b along the length of the flange 42. A top edge of bracket side wall 28 is flush with the top edge of flange second section 42b. The bracket side wall 28 is substantially rectangular in shape and also includes top and bottom surfaces, and first and second side edges. Bracket side wall 28 extends in a direction perpendicular to base top edge 24a and substantially parallel with flange first section 42a. Bracket side wall 28 connects to the flange second section 42b along the first side edge along the length of flange 42. A piano-type hinge 52 is attached to the second side edge for attaching patch panel 36.

First and second patch panels 34, 36 extend vertically and are coupled to the first and second said side walls 26, 28, respectively. Each patch panel 34, 36 is substantially rectangular in shape and includes top and bottom surfaces, and side edges. The first and second patch panels 34, 36 are connected by the piano-type hinges 50, 52 for pivotal movement about first and second substantially vertical and parallel pivot axes 38, 40. Each patch panel 34, 36 can be pivoted between an open position (FIG. 3) and a closed position (FIG. 2). Thus, power and data connection can be positioned where they are needed to connect to the servers with minimal cable lengths. A knuckle/aperture coupling can be used in lieu of the hinges. Each hinge 50, 52 defines the pivot axis 38, 40 for the respective patch panel.

Each panel 34, 36 has a plurality of rectangular shaped openings 66, 68 which are adapted for receiving a variety of cross-connect products, e.g., jacks, connectors, and/or modules. Patch panel openings 66, 68 can be any polygonal shape, however square or rectangular openings 66, 68 are preferred for receiving a wide array of conventional jacks and connectors. The long sides of the rectangle are orientated in a direction substantially parallel to respective piano-type hinges 50, 52. A space is disposed between adjacent openings 66, 68 for accommodating adjacent positioning of cross-connect products. FIGS. 1–3, illustrate patch panel 34 with a data jack 70 received in one opening 66. A locking groove 72 is disposed on at least one edge 74 of the openings 66, 68 for receiving a corresponding projection of snap-fit data jack 70 or data module 64. Alternatively, the projection can be placed on the opening and the groove 72 on the data jack 70 or data module 64. In a preferred embodiment, the data jacks 70 or data modules 64 are snap-fit into the grooves on the patch panel openings 66, 68. However, the components can be installed by a biasing component and/or fastening element such as a screw.

Patch panels 34, 36 are typically used for converting 25-pair connectorized cable into fields of numbered jacks. The panel features Category 5 modular 50-pin/25 pair interfaces connected by a PCB (printed circuit board) to 12 two-pair, 8-position, Ethernet wired RJ45 modular jacks. 25-pair cable assemblies with 90° and 110° connectors are secured to a side of the panel using cable ties.

Each panel 34, 36 can be stacked on top of or below other assemblies. This feature is possible since the cables entering the bracket 22 are not required to enter the bracket 22 through the top or bottom of the bracket 22.

Patch panel 34 has a substantially L-shaped protuberance 54 extending from a free edge. Patch panel 36 also has a substantially rectangular protuberance 56 extending from a free edge, preferably the side edge as seen in FIG. 3. Protuberances 54, 56 have rounded edges. Each protuberance 54, 56 is integrally connected to the respective panel 34, 36 and each has an aperture 58, 60 for receiving a selectively engageable retaining element 62 such as a screw. Other selectively engageable retaining elements may be used. For instance, bayonet-type or snap-fit fasteners can be employed to simplify opening and closing each panel 34, 36.

Each protuberance 54, 56 can be selectively angled for facilitating connection of each panel 34, 36 in the closed positions (FIG. 2). For example, as depicted in FIG. 3, second patch panel 36 has a data module 64 affixed thereto. Protuberance 56 is substantially bent at an angle perpendicular to the patch panel 36. Additionally, the protuberance 56 is stepped or two-tiered. When in a closed position (FIGS. 2 & 5), access to the cable receiving passageway 30 is restricted by the patch panels 34, 36.

Although, the present invention can be used with most typical multimedia cross-connect, a typical snap-fit data jack 70 is depicted in FIG. 4. The data jack 70 is a typical modular jack as manufactured by Hubbell Incorporated, part no. VPMI, Infie Modular Jack. The data jack 70 illustrated provides maximum bandwith for all of LAN, multimedia, and VoIP (voice over internet protocol) applications. The data jack 70 includes nose contacts for controlling crosstalk, a dust cover 78 for protecting port 80, and snap-in installation. However, any suitable modular data jack can be used for operations including converting 25-pair connectorized cable into fields of numbered data modules and/or jacks. This high-density design provides high quality, rugged strength, and consistent electrical performance.

OPERATION

To access the cable receiving passageway 30, the installer initially pivots each patch panel 34, 36 from the closed positions as shown in FIG. 2 to the open positions as shown in FIG. 3. The installer removes the selectively engageable retaining element 62 or screw before pivoting each patch panel 34, 36 about its respective pivot axis 38, 40. Only one selectively engageable retaining element 62 is needed to secure and release the patch panel as shown. Once each patch panel 34, 36 is in the open position shown in FIG. 3, additional access to cable receiving passageway 30 and the interior of the mounting bracket 22 can be achieved.

Figure 6:
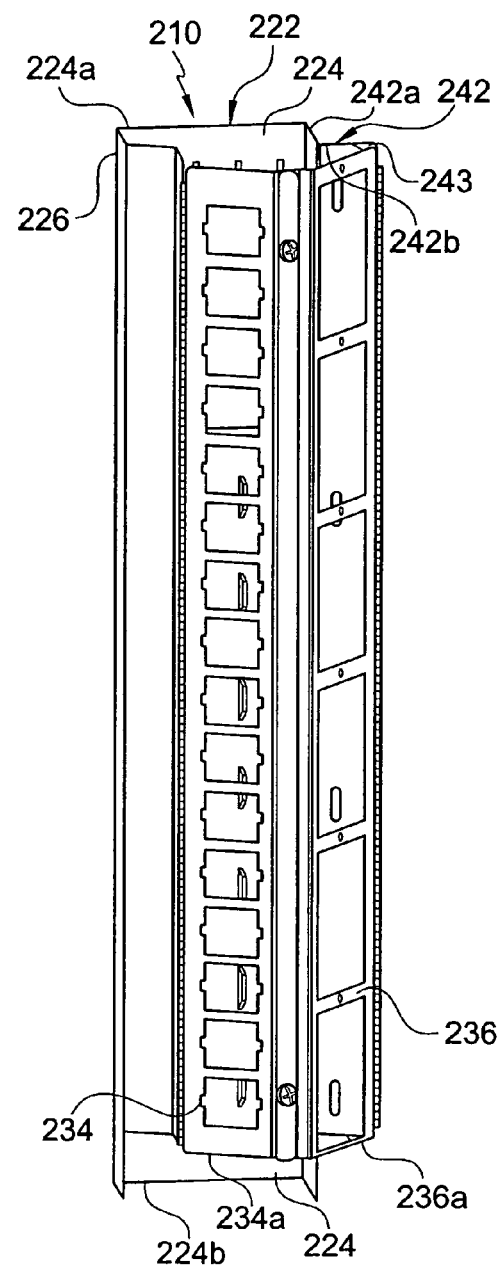
FIG. 6 is a perspective view of a patch panel assembly in accordance with a second embodiment of the present invention.

A patch panel assembly 210 according to a second embodiment of the present invention is disclosed in FIG. 6. In this embodiment, first side wall 226 of the bracket 222 is flush with a top edge 224*a* of base 224. Furthermore, bottom edges 234*a*, 236*a* of patch panels 234, 236 do not extend to bottom edge 224*b* of base 224. The second embodiment illustrates that various sizes and shapes can be used to accommodate cross-connect products and hardware of varying sizes.

Figure 7:
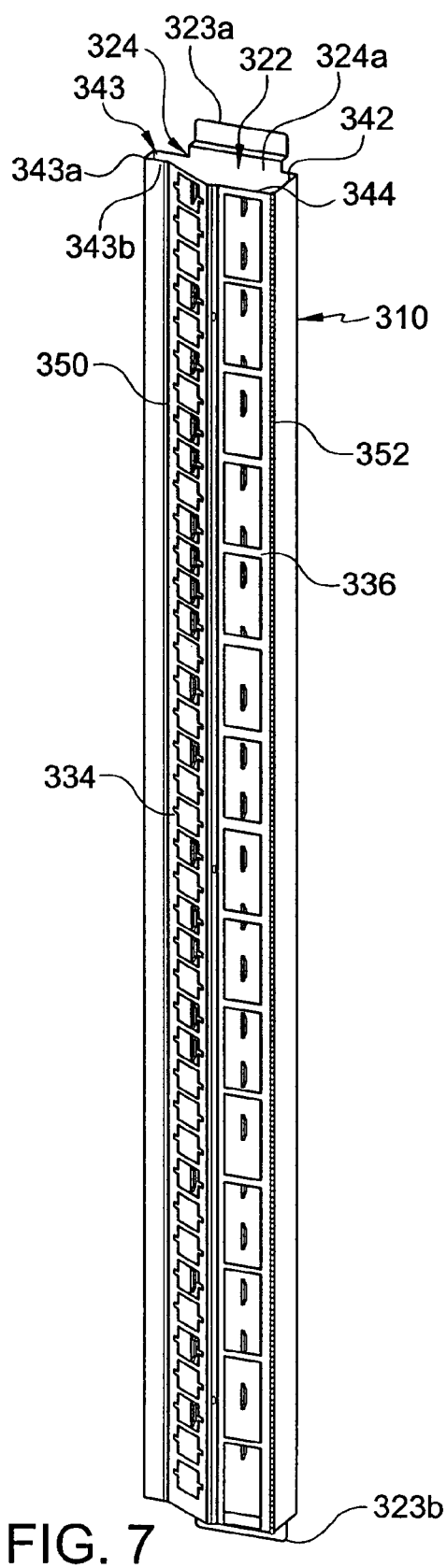
FIG. 7 is a perspective view of a patch panel assembly in accordance with a third embodiment of the present invention.
Figure 8:
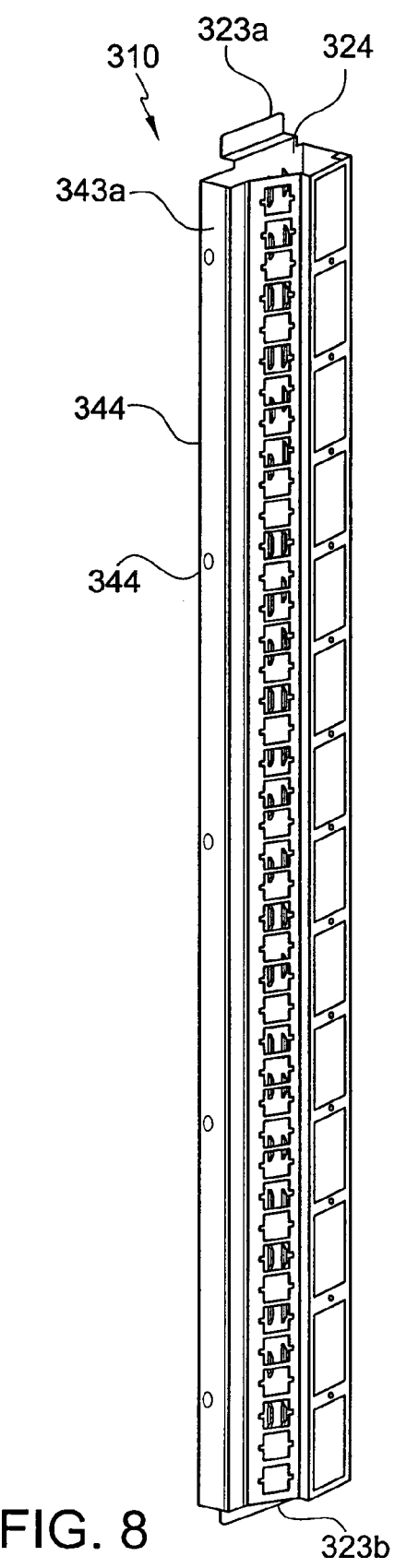
FIG. 8 is a perspective view of the patch panel assembly of FIG. 7 illustrating key slots.

A patch panel assembly 310 according to a third embodiment of the present invention is disclosed in FIGS. 7 and 8. In this embodiment, patch panel assembly 310 includes a bracket 322 having a base 324 with integrated first and second side walls 342, 343. Side walls 342, 343 form a continuous or unitary member therewith. First side wall 342 extends perpendicularly from a top surface 324*a* of base 324. A patch panel stop member 344 extends from the first side wall 342 in a direction parallel to the top edge of base 324 for limiting rotation of patch panel 336. An edge of first side wall 342 is connected to a piano-type hinge 352 for connecting patch panel 336 to the base 324. Second side wall 343 is substantially C-shaped. Second side wall 343 has a first section 343*a* which extends perpendicularly from top surface 324*a* and a second section 343*b* which extends substantially parallel with top surface 324*a*. Patch panel 334 is connected to one side of the second section 343*b* by a piano-type hinge 350.

Z-shaped stabilizers 323*a*, 323*b* are connected to top and bottom edges of the base 324. The stabilizers 323*a*, 323*b* distribute the weight more evenly about a centerline of the patch panel assembly 310. First and third sections of each stabilizer extend outwardly in a direction perpendicular to the top or bottom edge of the base 24. A second section of each stabilize extends in a direction parallel to the respective top or bottom edge of the base 24. Each section is rectangular in shape. The stabilizers 323*a*, 323*b* are integrally connected by welding, stamping, or conventional fastening.

The patch panel assembly 310 includes key slots 344 located in the first section 343*a* of the first side wall 343 for connecting the patch panel assembly to a wall. However, it should be understood that apertures can be placed on any part of the base 324 for securing the patch panel assembly 310 to a wall.

All elements of the cable management system 12 and patch panel assemblies 10, 210, and 310 described are preferably constructed from aluminum. However, other metals and other materials with sufficient structural characteristics can be used. The operation described for cable management system 12 of the first embodiment of the present invention would also apply to the other embodiments described above.

While a particular embodiment has been chosen to illustrate the invention, it will understood by those skilled in the art that various changes and modifications can be made therein without departing from the scope of the invention as defined in the appended claims.

What is claimed is:

1. A cable management system, comprising:
    a rack including a support frame having a wall, and an electronic device support;
    a bracket including a base extending between first and second side walls, and defining a cable receiving passageway;
    a first patch panel vertically coupled to said first side wall for pivotal movement about a first vertical pivot axis between open and closed positions;
    a second patch panel vertically coupled to said second side wall for pivotal movement about a second vertical pivot axis between open and closed positions, said second patch panel being selectively engageable with said first panel in said closed positions thereof for limiting access-to and extending across the cable receiving passageway; and
    a plurality of electrical connectors disposed in a plurality of openings for receiving said electrical connectors located in one of said first and second patch panels.

2. A cable management system according to claim 1 wherein
    the other of said first and second patch panels includes a plurality of openings for receiving electrical connectors.

3. A cable management system according to claim 1 wherein
    each said electrical connector is snap-fit into one of said plurality of openings.

4. A cable management system according to claim 1 wherein
    a securing element is disposed upon a surface of said base for retaining cables, wires, or connectors.

5. A cable management system according to claim 4 wherein
    said securing element is a hook.

6. A cable management system according to claim 1 wherein
    a panel hinge couples said first and second patch panels to said first and second side walls.

7. A cable management system according to claim 1 wherein
    a retaining element secures said first and second patch panels in the closed positions.

8. A cable management system according to claim 1 wherein
    a fastener extends through said base for securing said bracket to said wall.

9. A cable management system according to claim 1 wherein
    a fastener extends through a flange integrally connected to said base for securing said bracket to said wall.

10. A cable management system, comprising:
    a rack including a support frame having a wall, and an electronic device support;
    a bracket including a base extending between first and second side walls, and defining a cable receiving passageway;
    a first patch panel vertically coupled to said first side wall for pivotal movement about a first vertical pivot axis between open and closed positions; and
    a second patch panel vertically coupled to said second side wall for pivotal movement about a second vertical pivot axis between open and closed positions, said second patch panel being selectively engageable with said first panel in said closed positions thereof for limiting access to and extending across the cable receiving passageway;
    a fastener extending through a flange integrally connected to said base for securing said bracket to said wall; and
    a patch panel stop member disposed upon an edge of said flange for limiting rotation about said second vertical pivot axis.

11. A patch panel assembly, comprising:
    a bracket including a base extending between first and second side walls, and defining a cable receiving passageway;
    a first patch panel coupled to said first side wall for pivotal movement about a first vertical pivot axis between open and closed positions;
    a second patch panel vertically coupled to said second side wall for pivotal movement about a second vertical pivot axis between open and closed positions, said second patch panel being selectively engageable with said first panel in said closed positions thereof for limiting access to and extending across the cable receiving passageway; and
    a plurality of electrical connectors disposed in a plurality of openings for receiving said electrical connectors located in one of said first and second patch panels, each said electrical connector being snap-fit into one of said plurality of openings.

12. A patch panel assembly according to claim 11 wherein
    the other of said first and second patch panels includes a plurality of openings for receiving electrical connectors.

13. A patch panel assembly according to claim 11 wherein
    a fastener extends through said base for securing said bracket to a wall.

14. A patch panel assembly according to claim 11 wherein
    a fastener extends through a flange integrally connected to said base for securing said bracket to a wall.

15. A patch panel assembly according to claim 11 wherein
    a securing element is disposed upon a surface of said base for retaining cables, wires, or connectors.

16. A patch panel assembly according to claim 15 wherein
    said securing element is a hook.

17. A patch panel assembly according to claim 11 wherein
    a panel hinge couples said first and second patch panels to said first and second side walls.

18. A patch panel assembly according to claim 11 wherein
    a retaining element secures said first and second patch panels in the closed positions.

19. A patch panel assembly, comprising:
    a bracket including a base extending between first and second side walls, and defining a cable receiving passageway;
    a first patch panel coupled to said first side wall for pivotal movement about a first vertical pivot axis between open and closed positions;
    a second patch panel vertically coupled to said second side wall for pivotal movement about a second vertical pivot axis between open and closed positions, said second patch panel being selectively engageable with said first panel in said closed positions thereof for limiting access to and extending across the cable receiving passageway;
    a plurality of electrical connectors, each said electrical connector being snap-fit into one of a plurality of openings located in one of said first and second patch panels;

a fastener extending through a flange integrally connected to said base for securing said bracket to a wall; and a patch panel stop member disposed upon an edge of said flange for limiting rotation about said second vertical pivot axis.

20. A patch panel assembly, comprising:

a bracket including a base extending between first and second side walls, and defining a cable receiving passageway;

a first patch panel coupled to said first side wall for pivotal movement about a first vertical pivot axis between open and closed positions;

a second patch panel vertically coupled to said second side wall for pivotal movement about a second vertical pivot axis between open and closed positions, said second patch panel being selectively engageable with said first panel in said closed positions thereof for limiting access to and extending across the cable receiving passageway; and a fastener extends through a flange integrally connected to said base for securing said bracket to a wall;

a patch panel stop member is disposed upon an edge of said flange for limiting rotation about said second vertical pivot axis.

21. A patch panel assembly according to claim 20 wherein one of said first and second patch panels includes a plurality of openings for receiving electrical connectors.

22. A patch panel assembly according to claim 21 wherein the other of said first and second patch panels includes a plurality of openings for receiving electrical connectors.

23. A patch panel assembly according to claim 21 wherein each said electrical connector is snap-fit into one of said plurality of openings.

24. A patch panel assembly according to claim 20 wherein a fastener extends through said base for securing said bracket to a wall.

25. A patch panel assembly according to claim 20 wherein a securing element is disposed upon a surface of said base for retaining cables, wires, or connectors.

26. A patch panel assembly according to claim 25 wherein said securing element is a hook.

27. A patch panel assembly according to claim 20 wherein a panel hinge couples said first and second patch panels to said first and second side walls.

28. A patch panel assembly according to claim 20 wherein a retaining element secures said first and second patch panels in the closed positions.

* * * * *